US011003843B2

(12) United States Patent
Hosokawa et al.

(10) Patent No.: US 11,003,843 B2
(45) Date of Patent: *May 11, 2021

(54) ENHANCED ANNOTATION TOOL

(71) Applicant: International Business Machines Corporation, Armonk, NY (US)

(72) Inventors: Satoshi Hosokawa, Tokyo (JP); Shunsuke Ishikawa, Tokyo (JP); Keisuke Nitta, Koshigaya (JP); Yuka Nomura, Tokyo (JP); Atsushi Ono, Tokyo (JP); Chikako Oyanagi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,178

(22) Filed: Mar. 17, 2020

(65) Prior Publication Data

US 2020/0218854 A1 Jul. 9, 2020

Related U.S. Application Data

(63) Continuation of application No. 15/264,646, filed on Sep. 14, 2016, now Pat. No. 10,635,854.

(60) Provisional application No. 62/222,581, filed on Sep. 23, 2015.

(51) Int. Cl.
*G06F 40/169* (2020.01)
*G06F 40/106* (2020.01)
(52) U.S. Cl.
CPC .......... *G06F 40/169* (2020.01); *G06F 40/106* (2020.01)

(58) Field of Classification Search
CPC .............................. G06F 40/169; G06F 40/106
USPC .......................................................... 715/232
See application file for complete search history.

(56) References Cited

U.S. PATENT DOCUMENTS

| 6,230,170 | B1 | 5/2001 | Zellweger |
| 8,584,008 | B1 | 11/2013 | Dulaney |
| 2003/0229607 | A1 | 12/2003 | Zellweger |
| 2008/0222511 | A1 | 9/2008 | Kambhatla |
| 2014/0095972 | A1 | 4/2014 | Molesky |
| 2014/0344662 | A1 | 11/2014 | Isabel |
| 2016/0070688 | A1 | 3/2016 | Yao |
| 2017/0052680 | A1 | 2/2017 | Chegini |
| 2017/0083497 | A1 | 3/2017 | Hosokawa |

OTHER PUBLICATIONS

Cunningham, et al., "Developing Language Processing Components with GATE Version 7 (a User Guide)", Built Feb. 8, 2012. https://gate.ac.uk/releases/gate-7.0-build4195-ALUdoc/tao/ Last accessed Sep. 15, 2015. 204 pages.

(Continued)

*Primary Examiner* — Andrew R Dyer
*Assistant Examiner* — Jenq-Kang Chu
(74) *Attorney, Agent, or Firm* — Jay Wahlquist

(57) ABSTRACT

A system comprises a display unit; an input device configured to receive user input; and a processing unit communicatively coupled to the display unit and the input device. The processing unit is configured to cause the display unit to display a plurality of lines of natural language text on the display unit together with corresponding annotations including a plurality of relation lines. The processing unit is further configured to adjust spacing between each of the plurality of lines of natural language text based on the corresponding annotations.

17 Claims, 14 Drawing Sheets

(56) References Cited

OTHER PUBLICATIONS

Hagen, Karl, "Particles", Polysyllabic, last printed Jun. 19, 2018, 3 pages, <https://www.polysyllabic.com/?q=navigating/otherphrases/pp/particles>.
Hosokawa, et al., "Enhanced Annotation Tool", U.S. Appl. No. 62/222,581, filed Sep. 23, 2015.
List of IBM Patents or Patent Applications Treated as Related, Mar. 14, 2020, 2 pages.
Manning et al., "The Stanford CoreNLP Natural Language Processing Toolkit," https://stanfordnlp.github.io/CoreNLP/, 14 pages, initial released on Nov. 1, 2010.
Unknown, "brat rapid annotation tool", Current version: v1.3 Crunchy Frog (Nov. 8, 2012) http://brat.nlplab.org/ Last accessed Aug. 27, 2015. 2 pages.
Unknown, "ehost A tool for semantic annotation and lexical curation", Google Project Hosting. https://code.google.com/p/ehost/ Last accessed Aug. 27, 2015. 5 pages.
Unknown, "IBM Watson Knowledge Studio Overview", IBM, https:/lwww.ibm.com/watson/developercloud/doc/wks/Nks_overview_full.shtml Last accessed Sep. 12, 2016. 26 pages.
Unknown, "IBM Watson Knowledge Studio provides an end-to-end system that enables developers and subject matter experts to teach Watson the linguistic nuances of industries and knowledge domains", IBM United States Software Announcement 216-241, dated Jun. 21, 2016. Corrected on Jun. 24, 2016 and Jul. 12, 2016. Last accessed on Sep. 12, 2016. 8 pages.
Unknown, "IBM Watson Knowledge Studio", IBM, https://www.ibm.com/marketplace/cloud/supervised-machine-earning/us/en-us Last accessed Sep. 12, 2016. 4 pages.

Coreference Chain Details

Coreference ID: #1

| Mention | Sentence |
|---|---|
| Thomas Edison | Thomas Edison was born on February 11, 1847, in Milan Ohio, and grew up in Port Huron, Michigan. |
| He | He died on October 18, 1931, in West Orange, New Jersey. |

[Merge] [Cancel] [OK] [Delete]

FIG. 13

ENHANCED ANNOTATION TOOL

BACKGROUND

The present disclosure relates to machine annotator technology. More specifically, the present disclosure relates to an annotation tool to assist human users in annotating documents in natural language text.

SUMMARY

Aspects of the disclosure provide a method, system, and computer program product for an enhanced annotation tool. In one embodiment, the system comprises a display unit; an input device configured to receive user input; and a processing unit communicatively coupled to the display unit and the input device. The processing unit is configured to cause the display unit to display a plurality of lines of natural language text on the display unit together with corresponding annotations including a plurality of relation lines. The processing unit is further configured to adjust spacing between each of the plurality of lines of natural language text based on the corresponding annotations.

The above summary is not intended to describe each illustrated embodiment or every implementation of the present disclosure.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which:

FIG. 13 depicts one embodiment of an example coreference chain.

Figure 1:
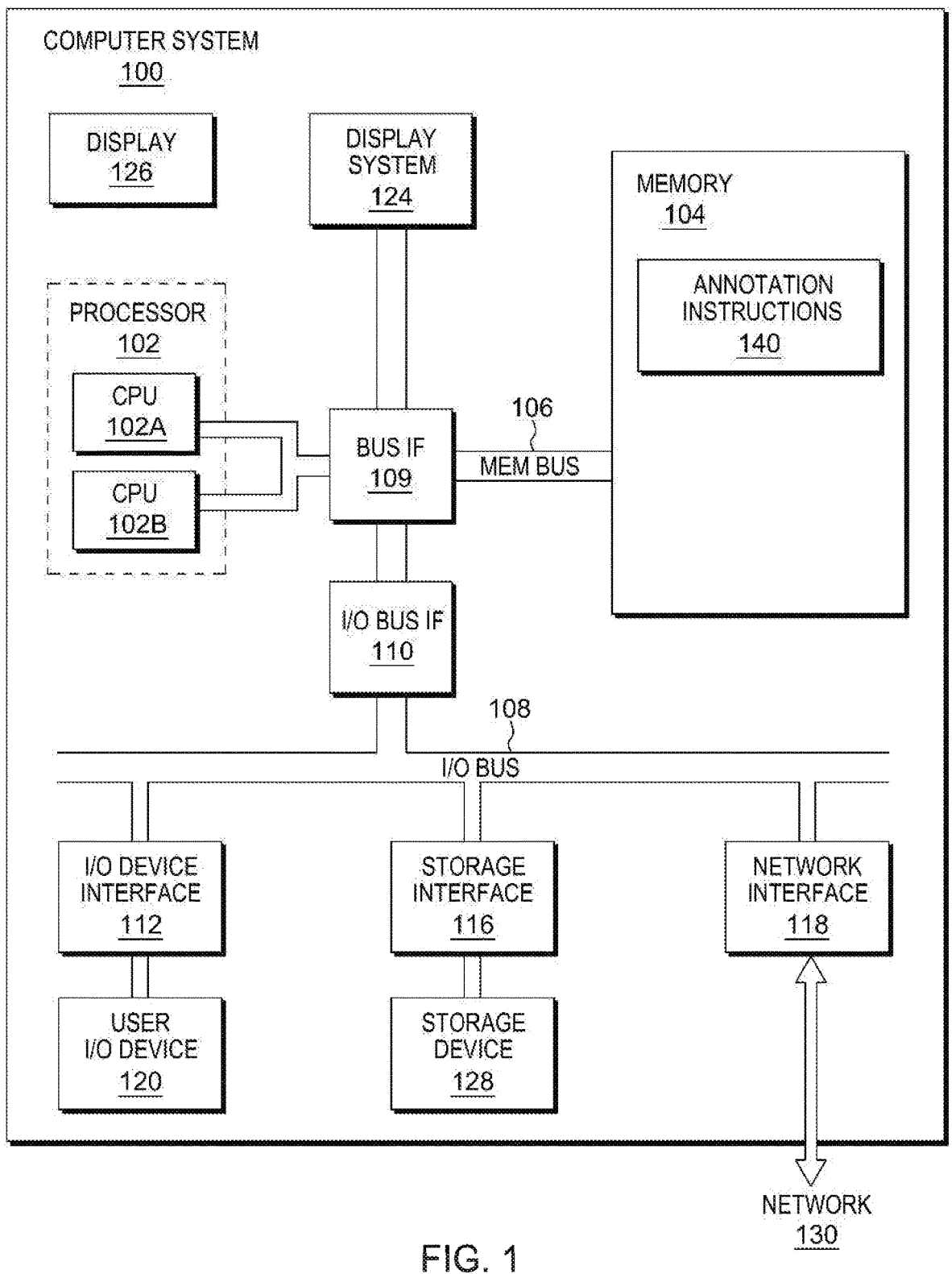
FIG. 1 is a high-level block diagram of one embodiment of an example computer system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

Machine annotator technology can be leveraged by machine learning systems, such as IBM's Watson technology, to enable automatic annotations of natural language documents. To create a machine annotator for a new domain, typically a large amount of human annotated documents, referred to as ground truth, is needed as training data for the machine learning system. The enhanced annotation tool described herein enables improved efficiency and/or usability for human annotation of documents, as compared to conventional annotation tools.

Figure 2:
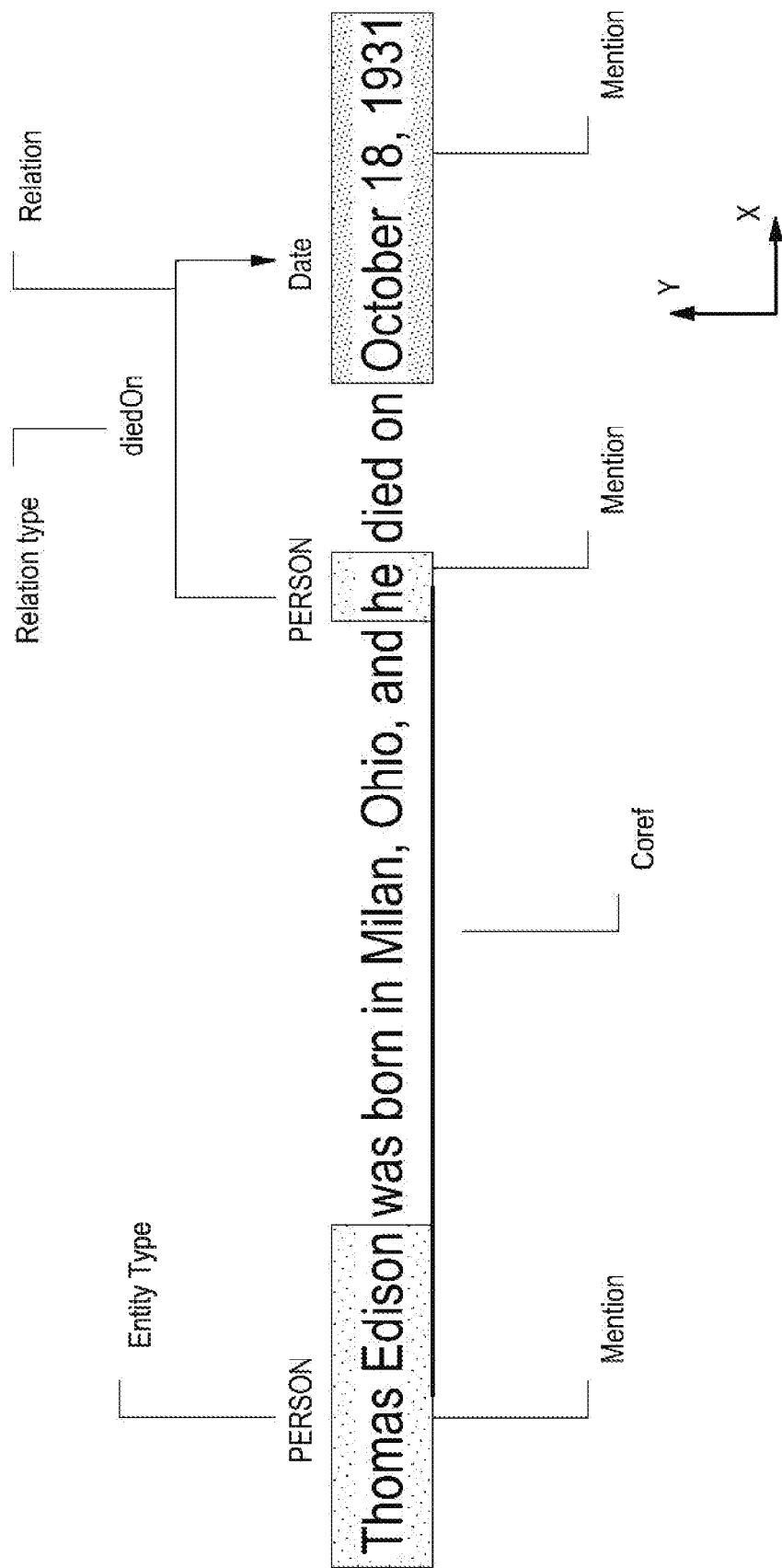
FIGS. 2-3 depict examples of annotated text displayed on embodiments of the example computer system of FIG. 1.

As used herein, the term "machine annotator" refers to a program that can annotate natural language documents based on machine learning technology. Additionally, as used herein, the term "human annotator" refers to a person who works on annotation of documents manually. As used herein, the term "human annotation" refers to an operation for a person to add annotations. The term "ground truth," as used herein, refers to training data for machine learning created via human annotation. As used herein, the term "corpus" refers to a set of documents leveraged to create a machine annotator for a new domain. As used herein, the term "mention" refers to occurrences of words or text which refer to the same entity. Thus, each occurrence of "Thomas Edison" is a mention of the same entity. Similarly, the term "co-reference" (also referred to as "coref" herein) refers to two or more different terms which refer to the same entity. For example, as shown in FIG. 2, the text "Thomas Edison" and the text "he" refer to the same person entity and, thus, are co-references as well as individual mentions of the same entity. Additionally, the term "relation" refers to a relationship between two or more words or text. For example, as shown in FIG. 2, the term "he" and "Oct. 18, 1931" have a relationship showed by the black relation line connecting the words. The relationship type is "diedOn" in this example.

FIG. 1 is a high-level block diagram of one embodiment of an example computer system 100. The components of the computer system 100 shown in FIG. 1 include one or more processors 102, a memory 104, a storage interface 116, an Input/Output ("I/O") device interface 112, and a network interface 118, all of which are communicatively coupled, directly or indirectly, for inter-component communication via a memory bus 106, an I/O bus 108, bus interface unit ("IF") 109, and an I/O bus interface unit 110.

In the embodiment shown in FIG. 1, the computer system 100 also includes one or more general-purpose programmable central processing units (CPUs) 102A and 102B, herein generically referred to as the processor 102. In some embodiments, the computer system 100 contains multiple processors. However, in other embodiments, the computer system 100 is a single CPU system. Each processor 102 executes instructions stored in the memory 104.

In some embodiments, the memory 104 includes a random-access semiconductor memory, storage device, or storage medium (either volatile or non-volatile) for storing or encoding data and programs. For example, the memory 104 may store annotation instructions 140 which are described in more detail below. For example, when executed by a processor such as processor 102, cause the processor 102 to perform the functions and calculations for enabling annotation of text, as described in more detail below. In some embodiments, the memory 104 represents the entire virtual memory of the computer system 100, and may also include the virtual memory of other computer systems coupled directly to the computer system 100 or connected via a network 130. In some embodiments, the memory 104 is a single monolithic entity, but in other embodiments, the memory 104 includes a hierarchy of caches and other memory devices. For example, the memory 104 can exist in multiple levels of caches, and these caches may be further divided by function, so that one cache holds instructions while another holds non-instruction data, which is used by the processor. The memory 104 may be further distributed and associated with different CPUs or sets of CPUs, as is known in any various so-called non-uniform memory access (NUMA) computer architectures, for example.

Hence, although the annotation instructions 140 are stored on the same memory 104 in the example shown in FIG. 1 for purposes of explanation, it is to be understood that other embodiments can be implemented differently. For example, the annotation instructions 140 can be distributed across multiple physical media.

Furthermore, in some embodiments, the annotation instructions 140 are executed by the same processor 102. However, in other embodiments, execution of the annotation instructions 140 is distributed across multiple processors located in the same or different computer systems. For example, in some such embodiments, at least a portion of the instructions and data structures associated with the annotation instructions 140 can be on different computer systems and accessed remotely, e.g., via a network 130. The computer system 100 can use virtual addressing mechanisms that allow the programs of the computer system 100 to behave as if they only have access to a large, single storage entity instead of access to multiple, smaller storage entities. Thus, the memory 104 can store all or a portion of the various programs, modules, and data structures for providing an enhanced annotation tool as described herein.

The computer system 100 in the embodiment shown in FIG. 1 also includes a bus interface unit 109 to handle communications among the processor 102, the memory 104, the display system 124, and the I/O bus interface unit 110. The I/O bus interface unit 110 is coupled with the I/O bus 108 for transferring data to and from the various I/O units. In particular, the I/O bus interface unit 110 can communicate with multiple I/O interface units 112, 116, and 118, which are also known as I/O processors (IOPs) or I/O adapters (IOAs), through the I/O bus 108. The display system 124 includes a display controller, a display memory, or both. The display controller can provide video, audio, or both types of data to a display device 126. The display memory may be a dedicated memory for buffering video data. The display system 124 is coupled with the display device 126, such as a standalone display screen, computer monitor, television, a tablet or handheld device display, or another other displayable device. In some embodiments, the display device 126 also includes one or more speakers for rendering audio. Alternatively, one or more speakers for rendering audio may be coupled with an I/O interface unit. In alternate embodiments, one or more functions provided by the display system 124 are on board an integrated circuit that also includes the processor 102. In addition, in some embodiments, one or more of the functions provided by the bus interface unit 109 is on board an integrated circuit that also includes the processor 102.

The I/O interface units support communication with a variety of storage and I/O devices. For example, the I/O device interface unit 112 supports the attachment of one or more user I/O devices 120, which may include user output devices (such as a video display devices, speaker, fax machine, printer, and/or television set) and user input devices (such as a keyboard, mouse, keypad, touchpad, trackball, buttons, light pen, or other pointing devices). A user can manipulate the user input devices 120 using a user interface, in order to provide input data and commands to the user I/O device 120 and the computer system 100. Additionally, a user can receive output data via the user output devices. For example, a user interface may be presented via the user I/O device 120, such as displayed on a display device, played via a speaker, or printed via a printer.

The storage interface 116 supports the attachment of one or more disk drives or direct access storage devices 128 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 128 is implemented via any type of secondary storage device. The contents of the memory 104, or any portion thereof, may be stored to and retrieved from the storage device 128 as needed. The network interface 218 provides one or more communication paths from the computer system 100 to other digital devices and computer systems.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 includes different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100, can include multiple I/O bus interface units 110 and/or multiple I/O buses 108 in other embodiments. While multiple I/O interface units are shown, which separate the I/O bus 108 from various communication paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, or any other suitable type of electronic device. In addition, in some embodiments, the computer system 100 can be implemented within a cloud computer system, or using one or more cloud computing services. Consistent with various embodiments, a cloud computer system can include a network-based, distributed data processing system that provides one or more cloud computing services. In certain embodiments, a cloud computer system can include many computers, hundreds or thousands of them, disposed within one or more data centers and configured to share resources over the network. However, it is to be understood that cloud computer systems are not limited to those which include hundreds or thousands of computers and can include few than hundreds of computers.

As discussed above, in some embodiments, one or more of the components and data shown in FIG. 1 include instructions or statements that execute on the processor 102 or instructions or statements that are interpreted by instructions or statements that execute the processor 102 to carry out the functions as described herein. In other embodiments, one or more of the components shown in FIG. 1 are implemented in hardware via semiconductor devices, chips, logical gates, circuits, circuit cards, and/or other physical hardware devices in lieu of, or in addition to, a processor-based system.

In operation, the computer system 100 is configured to provide an enhanced tool supporting human annotation of natural language text documents. In particular, in some embodiments, the computer system 100 is configured to provide a graphical user interface which enables visualization of relation lines by adjusting the vertical spaces between lines of natural language text without changing the horizontal positions of words in the annotated document. The documents can be stored in the memory 104 or on the storage device 128. The documents can also be accessed via the network interface 118 or the I/O device interface 112. In addition, in some embodiments, the computer system 100 manages the display positions of relations lines in layers by reducing overlap with the other layers so that each relation line can be more easily recognized. As used herein, the term "layer" refers to a vertical level above a line of text. Thus, items having the same y-coordinate are in the same "layer". Thus, through the use of vertical layers based on the y-coordinates, relation lines having the same or overlapping x-coordinates can be overlaid, merged, etc., as described in more detail below. Additionally, as understood by one of skill in the art, natural language text refers to text written and displayed using grammar and words readable by a human. For example a document displaying text using English words and formatted according to English grammar rules is a natural language text document.

Furthermore, in some embodiments, the computer system 100 draws vertical relation lines when connecting mentions across different text lines to reduce layers and vertical spaces even if the vertical relation lines overlap annotated text. Additionally, in some embodiments, the computer system 100 enables visualization of relation lines in sufficiently small spaces that the user interface can be implemented on smaller screens such as handheld touch devices, like so called "smartphones" and tablet computers. The computer system 100 is also configured, in some embodiments, to recalculate layers and positions to reduce the number of layers when the screen is resized.

Figure 3:
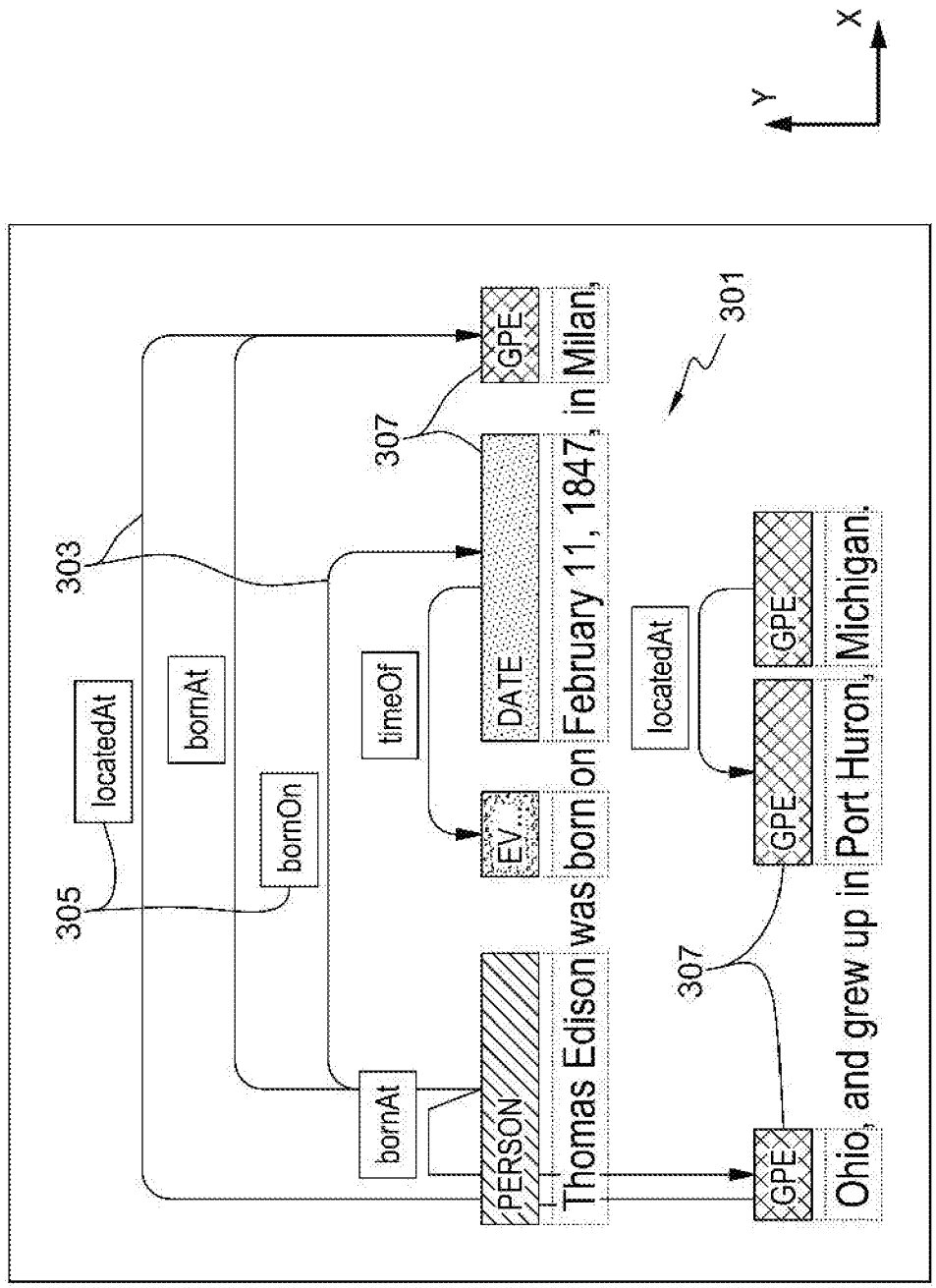

One example embodiment of a visual display implementing the elements discussed above, such as variable spaces between lines of text, vertical relation lines, etc., is shown in the example of FIG. 3. In the example shown in FIG. 3, the vertical space 301 between the lines of text has been increased to provide sufficient space for the relation lines 303, relation type descriptors 305, and entity descriptors 307. The entity descriptor blocks 307 can indicate mentions, entity types, corefs, etc. Although the vertical spacing between lines of text is adjusted, the horizontal position of the words in the lines of text is not changed.

Figure 14:
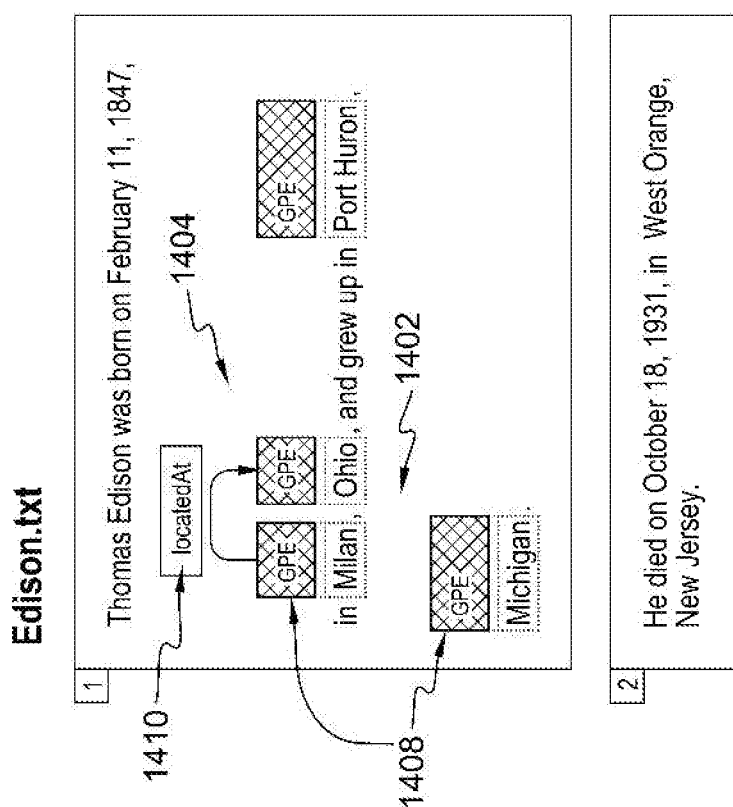
FIG. 14 depicts another example of annotated text displayed on embodiments of the example computer system of FIG. 1.
Figure 14:
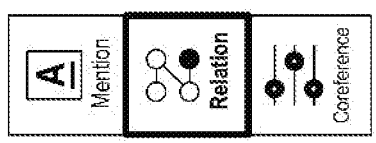

Another example of the enhanced annotation tool implementing one or more of the elements discussed herein is shown in FIG. 14. As shown in FIG. 14, the spaces 1402 and 1404 have been increased between lines of text to enable space for the relation lines 1406, entity descriptors 1408, and relation descriptors 1410. However, as with FIG. 3, the horizontal position of words in the lines of text is not altered when changing the vertical spacing or rendering the relation lines and mentions.

Figure 4A:
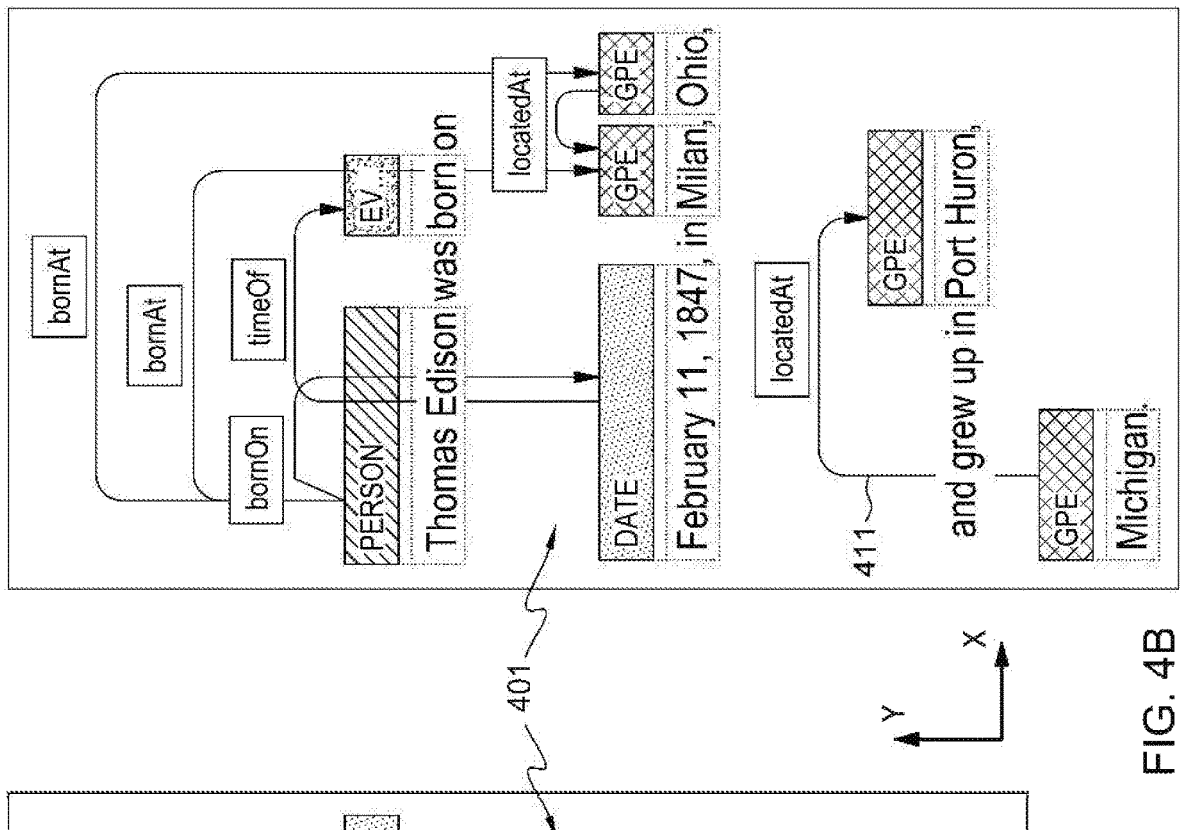
FIGS. 4A and 4B depict examples of annotated text displayed on embodiments of the example computer system of FIG. 1.
Figure 4B:
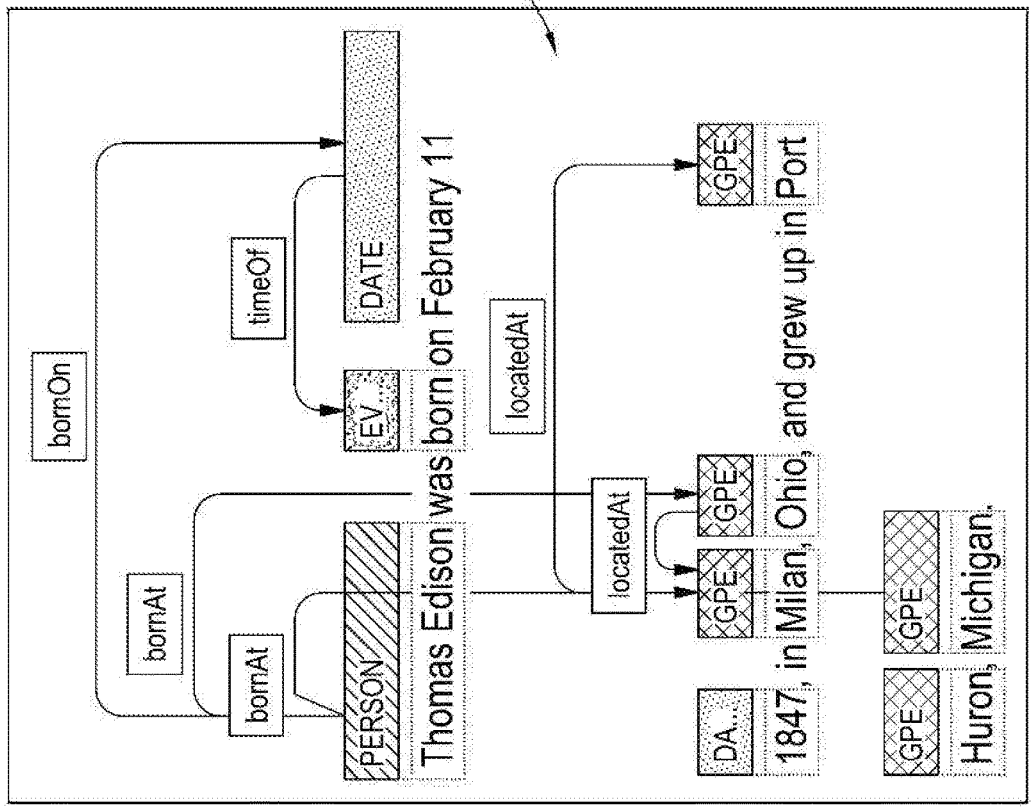

FIG. 4 demonstrates one example of how the layers and positions are recalculated/re-rendered upon resizing the screen. In particular, the computer system 100 calculates layers based not on a whole sentence, but on each wrapped text line and overlapping mention layers, as discussed in more detail below. For example, in FIG. 5, "Thomas Edison" has overlapping mentions. Hence, the mentions are rendered in different vertical layers and the relations for the mentions are classified into separate layers based on the target/source mentions. In addition, the computer system 100 draws vertical relation lines crossing over text lines when connecting mentions in different text lines to reduce the number of layers. The number of layers is reduced by not requiring additional horizontal lines over intervening lines of text between the lines of text containing the source and the target due to the ability to render vertical lines which overlap text. Also, the computer system 100 recalculates the layers and positions when the screen is resized and wrapped text positions are changed. Thus, by basing the number of layers and positions of text on wrapped text lines and overlapping mention layers rather than on a whole sentence, the computer system 100 enables rendering of the display on smaller screens and in smaller spaces. In particular, the computer system is able to adjust the wrapped text based on the resizing and, thereby, recalculate the layers and positions of relation lines, etc.

Figure 5:
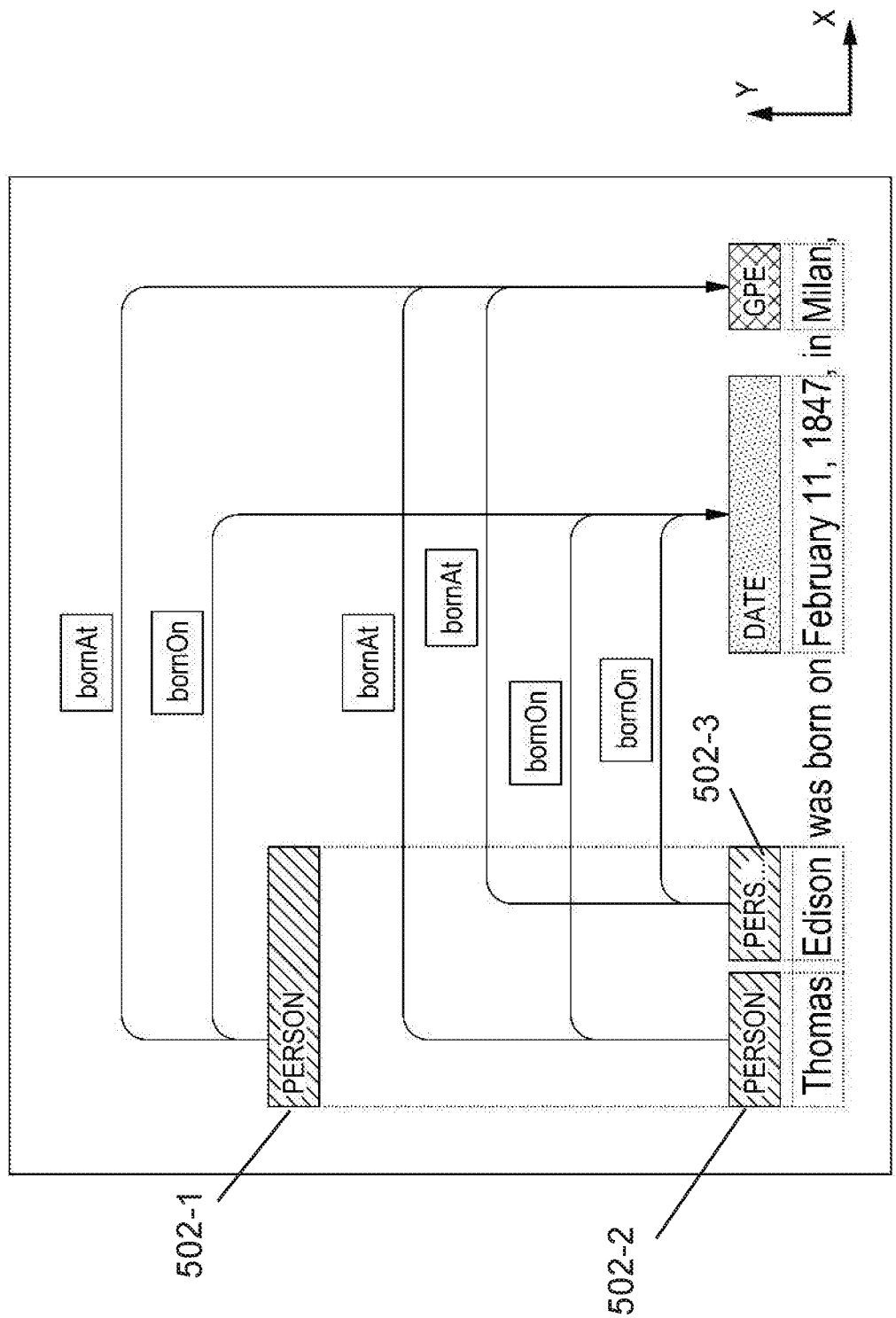
FIG. 5 depicts an example of annotated text displayed on embodiments of the example computer system of FIG. 1.

Additionally, as shown in the example of FIG. 5, the computer system 100 supports the relations on overlapping mentions. For example, the mention 502-1 identifying the text "Thomas Edison" overlaps the mention 502-2 identifying the text "Thomas" and the mention 502-3 identifying the text "Edison."

Figure 6:
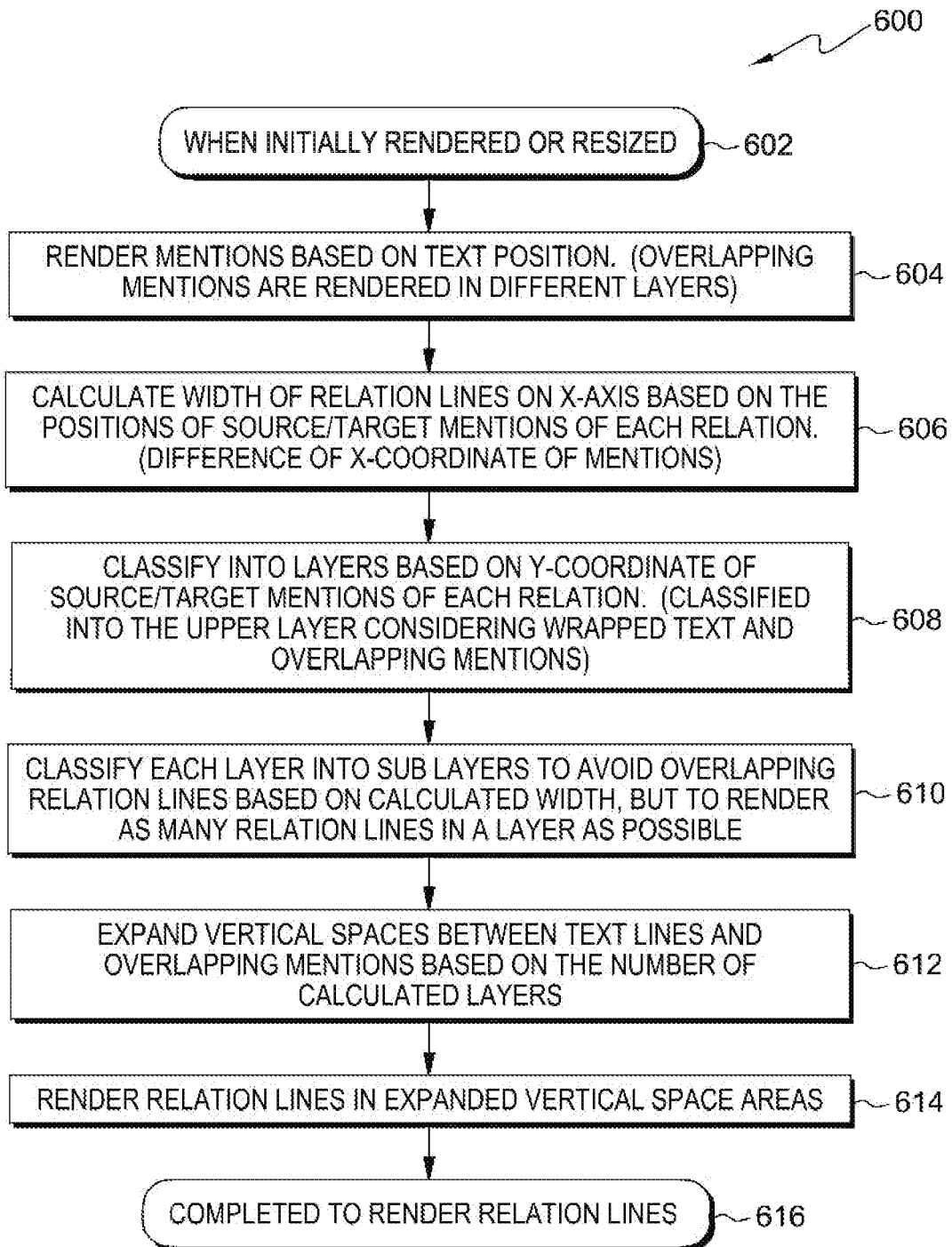
FIG. 6 is flow chart depicting one embodiment of an example method of annotating text.

FIG. 6 depicts one example of a method 600 of rendering annotation visualization in one embodiment of the enhanced annotation tool. The method 600 can be implemented by a processor in a computer system executing corresponding instructions, such as processor 102 executing annotation instructions 140 in computer system 100.

At block 602, the method 600 is initiated either for an initial rendering of the annotation visualization or for updating the annotation visualization after detecting that the display on a screen has been resized. For example, a user can resize a window displaying the text and annotation visualization. Upon detecting the resizing, the method 600 is initiated at block 602. Thus, the method 600 can be performed each time the screen is resized to update the display of the annotations. Updating the display can include wrapping the natural language text or changing how the natural language text is wrapped to change the number of lines of natural language text and corresponding portions of natural language text on each line. Additionally, resizing or updating the display of the relation lines can include readjusting the spacing between each of the plurality of lines of natural language text after changing the number of lines of natural language text and corresponding portions of natural language text on each line as discussed below.

At block 604, mentions are rendered based on text position. For example, as shown in the examples of FIGS. 2-5, text corresponding to a mention can be highlighted or set apart from surrounding text. In the example FIGs., text is highlighted using a dotted box around corresponding text. Additionally, in the example FIGs. mention descriptors are highlighted using patterns and hash lines for purposes of illustration only. However, it is to be understood that, in other embodiments, color backgrounds and outlining can be used to highlight text and/or mention descriptors. Additionally, different text or phrases annotated as the same entity type can have the same highlight color. The layer including the mention highlights is overlaid on the text and the position of the mention highlights is determined based on the location of the corresponding underlying text.

At block 606, the width of relation lines along an x-axis is calculated. As used herein, the x-axis refers to an axis parallel to the direction of the text. The x-axis and y-axis are labelled in FIGS. 2-5, 7-12, and 14. The x-axis is also referred to herein as the horizontal axis and the y-axis is also referred to herein as the vertical axis. The width is calculated based on the horizontal distance between the two mentions of a relation. For example, each relation can have a source and target mention. The width of the corresponding relation line is calculated based on the difference between the x-coordinates of the source and target mentions.

At block 608, the relation lines are classified into layers based on the y-coordinates of the source and target mentions of each respective relation line. Thus, wrapped text is taken into consideration where the source and target mentions may be on different lines due to the wrapped text and, thus, have different y-coordinates. In addition, overlapping mentions are taken into consideration by basing the layer classification on the y-coordinates. For example, as mentioned above with respect to the example shown in FIG. 5, overlapping mentions are drawn in separate vertical layers. The layer of corresponding relation lines is, thus, based on the y-coordinates of the corresponding overlapping mentions.

At block 610, the layers are classified into sub-layers based on the width calculated at block 606. In this way, the enhanced annotation tool avoids overlapping relation lines that have widths that overlap. In other words, the relation lines are classified into the layers based on the calculated widths in addition to being based on the y-coordinates or vertical positions of the source and target mentions. For example, in FIG. 5, the relation line between the mention "Thomas" and the mention "Milan" and the relation line between the mention "Edison" and the mention "Milan" would overlap along the x-axis if placed in the same layer. In addition, by classifying into sub-layers based on width, the number of relation lines in a single layer can be increased without overlapping relation lines that have the same width. In some embodiments, as many relation lines as possible are classified into the same sub-layer. Thus, the total number of layers can be reduced.

At block 612, the vertical spaces between lines of text is expanded based on the number of layers computed at block 610. In particular, the vertical space between each respective two lines of text is expanded to accommodate the number of layers between those respective two lines of text. As discussed above, a "layer" refers to objects having the same y-coordinates. Thus, each relation line is assigned a layer with a respective y-coordinate via blocks 608 and 610. At block 612, the vertical space is expanded to accommodate the layers based on the respective y-coordinates of the layers. At block 614, the relation lines are rendered in the expanded vertical space computed at block 612. At block 616, the method 600 ends.

Figure 7:
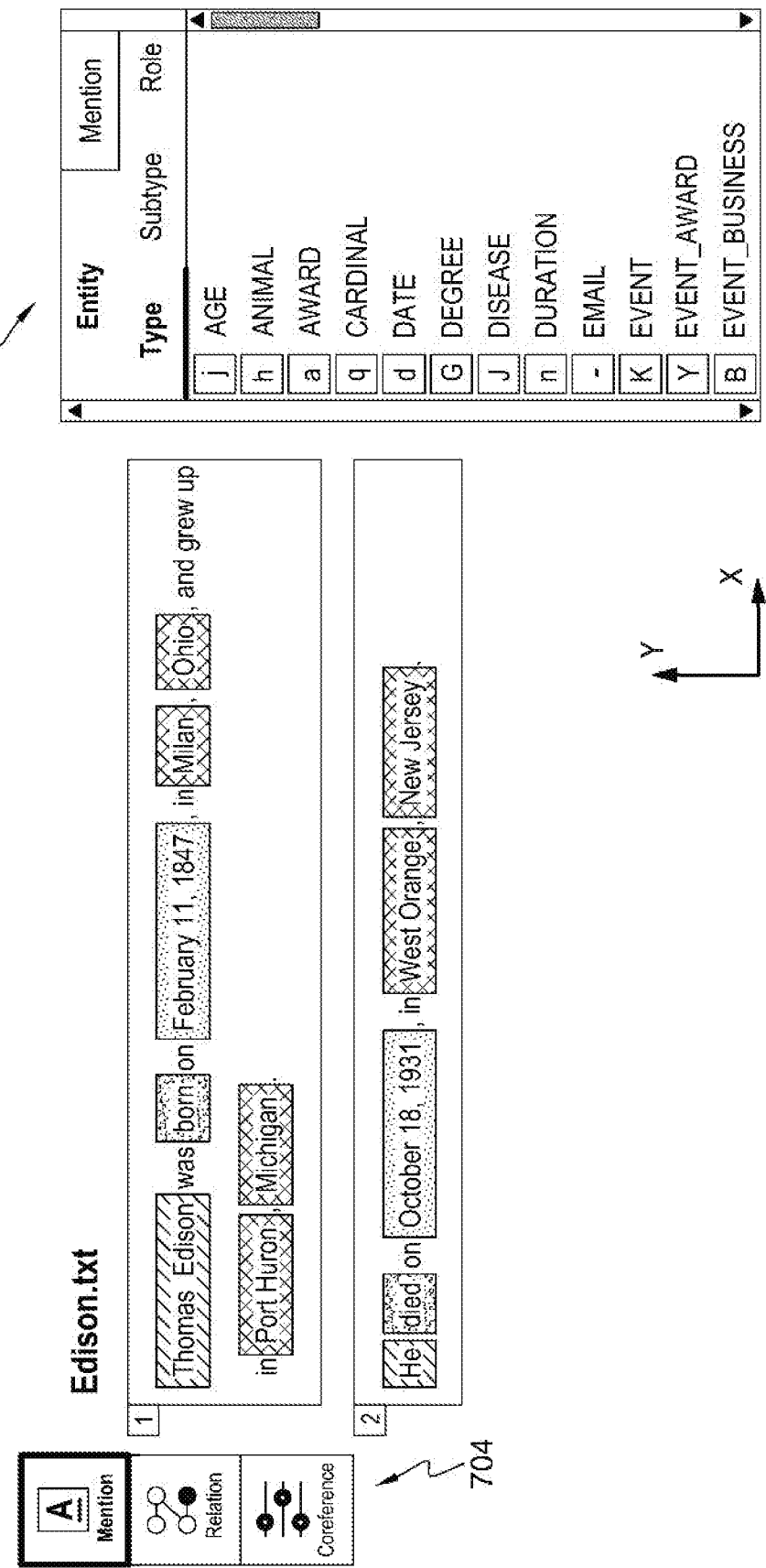
FIGS. 7-12 depict additional examples of annotated text displayed on embodiments of the example computer system of FIG. 1.

The enhanced annotation tool is also referred to herein as a Ground Truth Editor (GTE). The GTE improves effectiveness of human annotation by enabling the functions and displays discussed above. In addition, the GTE can operate in three modes to edit annotations. The three modes are Mention mode, Relation mode, and Co-reference mode. One example embodiment of a screen in the Mention Mode is shown in FIG. 7. As shown in FIG. 7, in Mention Mode, mentions are highlighted based on relationships between the mentions. For example, the terms or entities 'Ohio, 'Michigan', and 'New Jersey' are all of the same entity type and, thus, are highlighted with the same color or pattern. A key 702 is also displayed in the example of FIG. 7. The key 702 indicates which colors or patterns are associated with each displayed entity type. Also, as shown in FIG. 7, the key 702 can include options for displaying classifications of 'type', 'sub-type', and 'role'. By selecting one of the classifications, the colors or patterns associated with each mention will be updated to reflect the classification selected by the user. The user can select the different classifications for display using a user input device known to one of skill in the art, such as a touch screen display, a keyboard, a mouse, etc. The Mention Mode of the example in FIG. 7 also includes a mode select tool 704 which enables a user to switch between modes by selecting the corresponding mode. The mode select tool 704 highlights the current selected mode.

Figure 8:
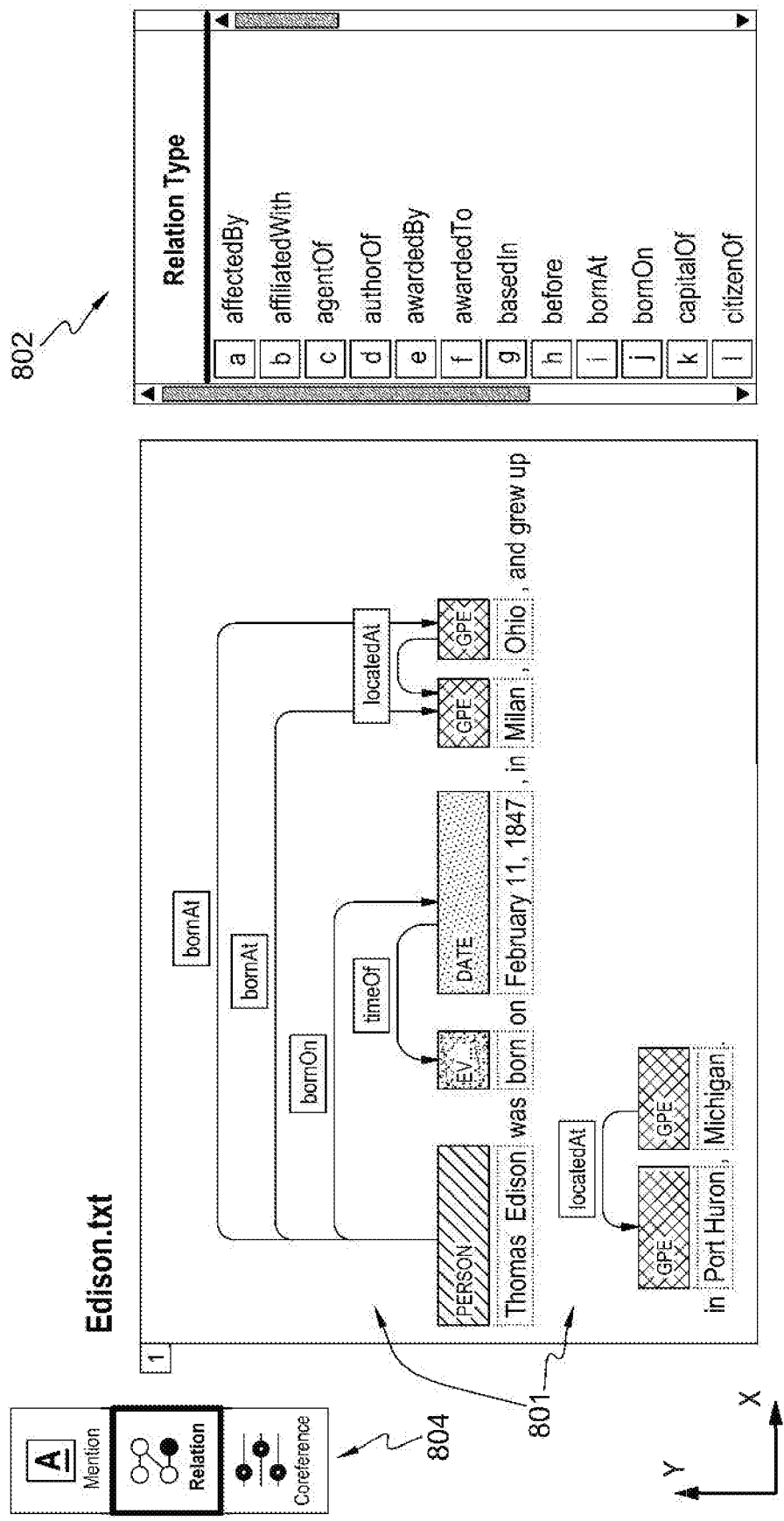

One example embodiment of a screen in the Relation Mode is shown in FIG. 8. As shown in FIG. 8, the Relation Mode includes expanding vertical space between lines of text as discussed above. Similar to the Mention Mode discussed above, the Relation Mode shown in the example of FIG. 8 also includes a key 802 which indicates the relation type for each relation based on the color or pattern associated with each relation type. Also displayed in the example Relation Mode of FIG. 8 is a mode select tool 804 similar to the mode select tool 704 of FIG. 7.

Figure 9:
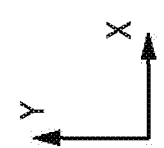

One example embodiment of a screen in the Co-reference Mode is shown in FIG. 9. As shown in the example of FIG. 9, the Co-reference Mode highlights co-references which refer to the same entity by using the same color or pattern. The Co-reference Mode in the example of FIG. 9 also includes a Co-ref key 902. The Co-ref key 902 lists the co-ref chains identified in the text being analyzed as well as the number of mentions in each co-ref chain. As used herein, a co-ref chain is a grouping of mentions which refer to the same entity. The example Co-reference mode of FIG. 9 also includes a mode select tool 904 similar to the mode select tool 704 discussed above.

Figure 10:
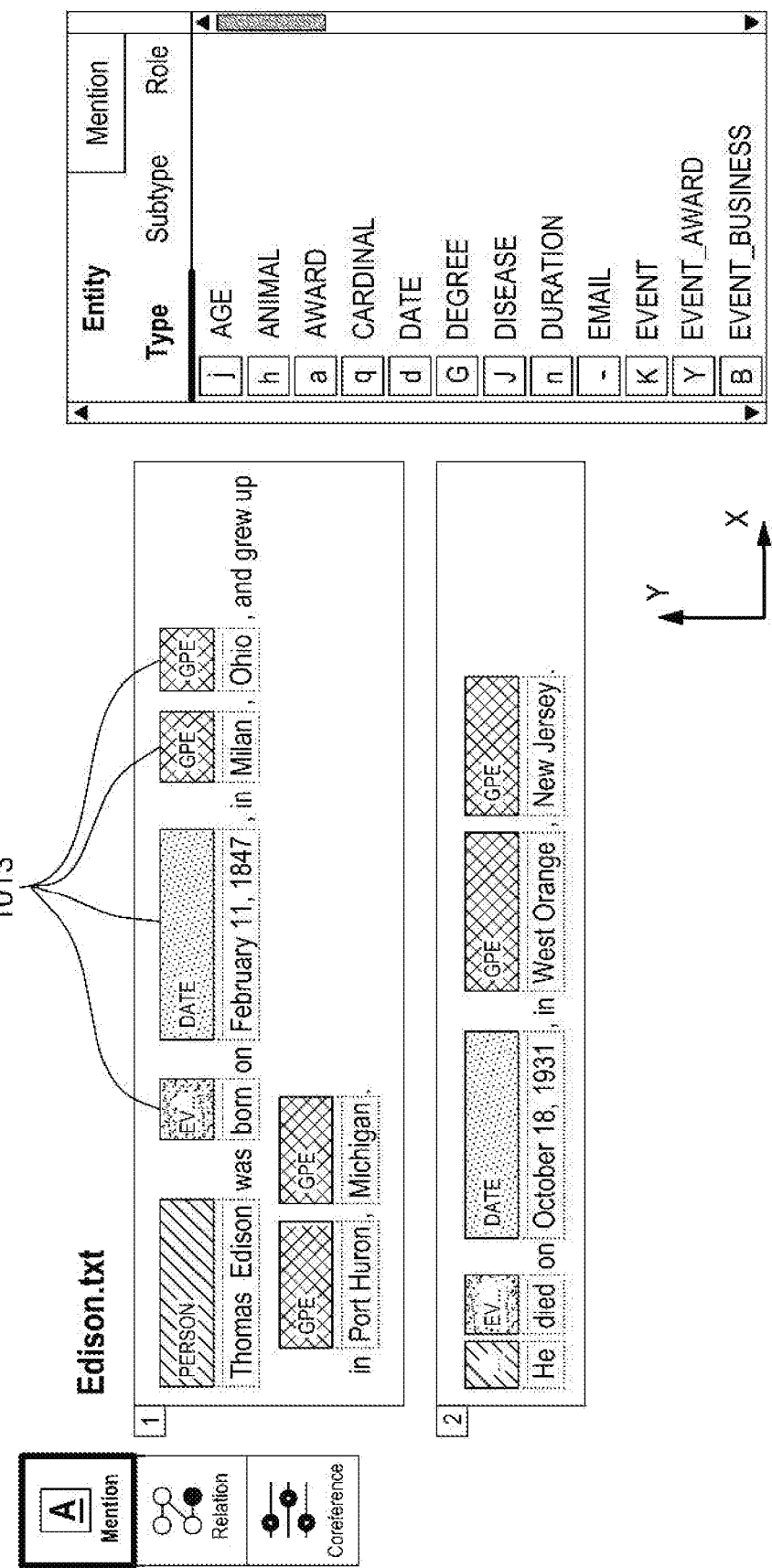

Thus, the GTE enables effective and unified operability. Additionally, in some embodiments, the GTE is easy to edit with less clicks than conventional annotation tools. The GTE also enables touch operation in some embodiments. The GTE also enables, in some embodiments, annotation visualization, user assistance, and/or sub-modes, such as zoom-in/zoom-out. One example of the zoom-in sub-mode of the Mention mode is depicted in FIG. 7. The zoom-in mode can be convenient for users to see as many sentences as possible on the screen. One example of the zoom-out sub-mode of the Mention mode is depicted in FIG. 10. The zoom-out mode can be convenient for users to see overlapping mentions. In addition, as can be seen in the Example of FIG. 10, the zoom-out mode includes labels identifying the different entity types of the displayed mentions whereas the zoom-in mode shown in FIG. 7 does not include the labels. The zoom-out mode expands the vertical space between lines of text to include the labels.

Figure 11:
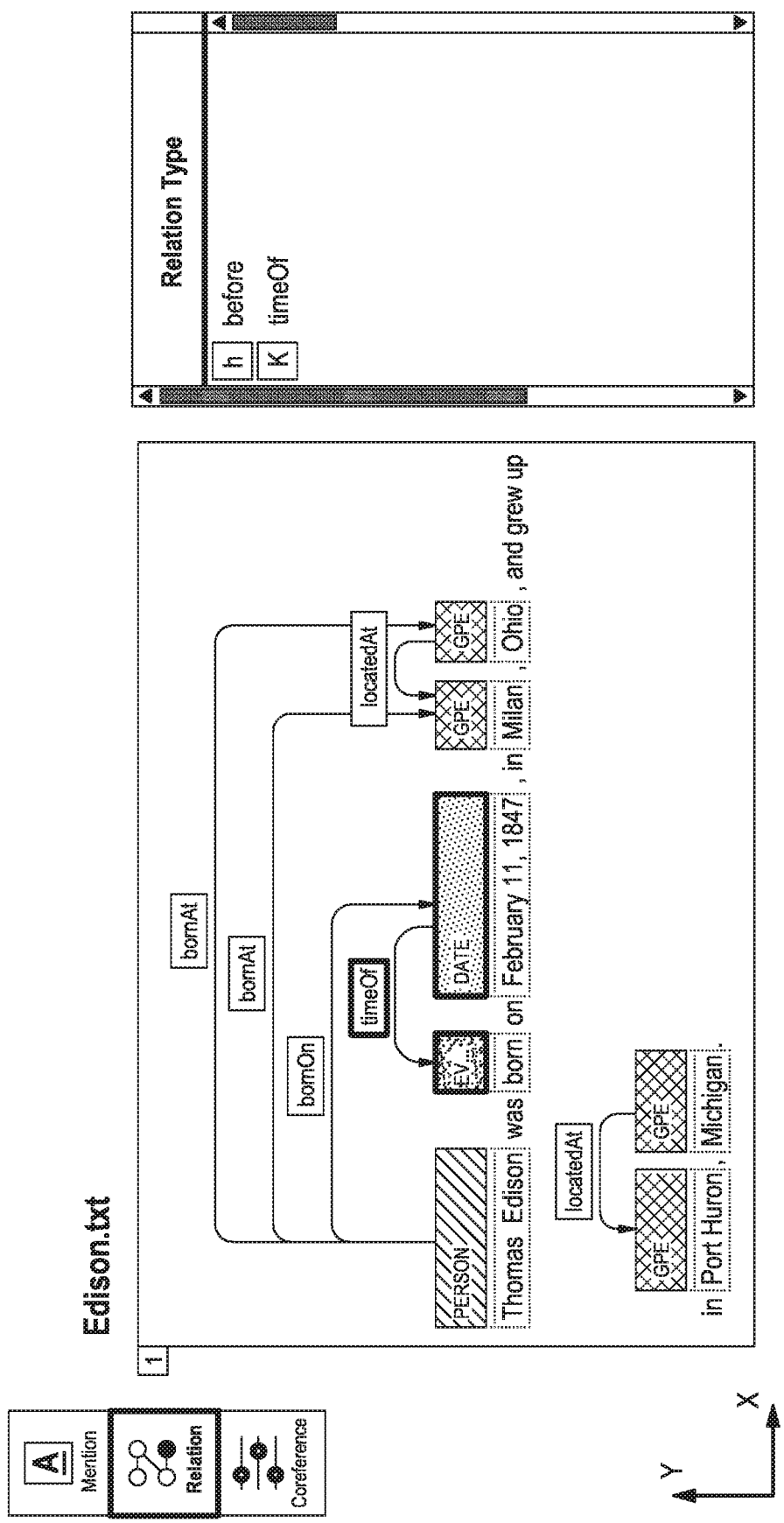

A user can switch between the modes by providing user input via an I/O device, such as a touch screen, keyboard, and/or mouse, as discussed above. In some embodiments, a user can also filter/highlight texts by providing input via the I/O device. The filter/highlight view can improve the user operability by filtering and highlighting only available items to reduce unnecessary choices. An example filter/highlight view in the Relation mode, based on user input/selections received via the I/O device, is depicted in FIG. 11. In particular, FIG. 11 depicts an example of a filter/highlight view when a user adds a new relation. In this example, a user has selected the 'Date' mention on the text 'Feb. 11, 1847'. The system is configured to determine and highlight possible target mentions which can be connected from the 'Date' mention as the source mention. The possible target mentions are determined based on the definition of relation type. For example, the relation type 'timeOf' can have a 'Date' mention type as a source mention and an 'Event' mention type as a target mention. Hence, in the example of FIG. 11, the 'Date' mention and 'Event' mention are highlighted through bolded lines around the relation type descriptor for 'timeOf', and entity descriptors for 'Date' and 'Event'. It is to be understood that although bold lines are used in this example for purposes of explanation, other techniques for highlighting can be used. For example, colored borders and backgrounds can be applied to the selected text and/or descriptors. This feature makes it easier for a user to add a new relation without having knowledge of the relation type definition.

Figure 12:
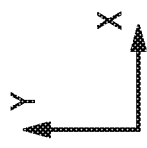

In addition, the Co-reference mode can be configured to show only necessary information for coref operations which improves usability. For example, the Co-reference mode enables a user to create a coref chain with relatively few clicks, merge coref chains, and partially delete coref chains. In addition, the Co-reference mode can be configured to view a coref chain in a whole document by clear highlighting visualization. One example of the highlighting view in the Co-reference mode is shown in FIG. 12. When a user selects a co-reference name, such as by hovering over a co-reference name or by selecting a checkbox, etc., the system is configured to highlight the mentions that belong to that co-reference chain. This feature can help a user obtain information easily on which mentions in the document are in the same co-reference chain. Additionally, one example of a coref chain list is depicted in FIG. 13. The coref chain list can be displayed in an overlapping pop-up frame or a separate window, for example. As shown in the example of FIG. 13, the displayed coref chain list shows the mentions includes in the coref chain along with the respective sentence from the document being analyzed in which each respective mention appears.

As discussed above, the functions described herein can be implemented by a processor or processing. The processing unit includes or functions with software programs, firmware or other computer readable instructions for carrying out various methods, process tasks, calculations, and control functions, used in providing the enhanced annotation tool.

These instructions are typically stored on any appropriate computer readable or processor-readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc.

Hence, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown.

What is claimed is:

1. A method of rendering annotation visualization, the method comprising:
   displaying a plurality of lines of natural language text on a display device, wherein natural language text is text written and displayed using grammar and words understandable by a human;
   rendering a plurality of relation lines, wherein each relation line connects a respective first term in the natural language text to a corresponding second term in the natural language text, wherein at least one relation line of the plurality of relation lines is rendered crossing over one or more words in one or more lines of the natural language text to connect the respective first term and the corresponding second term;
   classifying each relation line of the plurality of relation lines into a corresponding layer of a plurality of layers based on respective vertical and horizontal positions of the respective first term and the corresponding second term associated with each respective relation line; and
   adjusting vertical spacing between each of the plurality of lines of natural language text based on a respective number of layers between each of the plurality of lines of natural language text.

2. The method of claim 1, wherein classifying each relation line into a corresponding layer comprises:
   calculating a width of each relation line along a horizontal axis parallel to the direction of the natural language text based on a horizontal distance between the respective first term and the corresponding second term associated with each respective relation line; and
   classifying each of the plurality of layers into sub-layers based on the respective calculated widths of the plurality of relation lines associated with each layer.

3. The method of claim 2, further comprising:
   adjusting the vertical spacing between each of the plurality of lines of natural language text based on the number of sub-layers.

4. The method of claim 1, further comprising:
   resizing the display of the plurality of lines of natural language text and the plurality of relation lines;
   wherein resizing the display of the plurality of lines of natural language text includes wrapping the natural language text to change the number of lines of natural language text and corresponding portions of natural language text on each line;
   wherein resizing the display of the plurality of relation lines includes readjusting the vertical spacing between each of the plurality of lines of natural language text after changing the number of lines of natural language text and corresponding portions of natural language text on each line.

5. The method of claim 4, further comprising:
   reclassifying the plurality of relation lines into updated layers based on updated respective vertical positions of the respective first term and the corresponding second term associated with each relation line after resizing the display of the plurality of lines of natural text; and
   wherein readjusting the vertical spacing between each of the plurality of lines of natural language text comprises readjusting the vertical spacing between each of the plurality of lines of natural language text based on the number of updated layers between each of the plurality of lines of natural language text.

6. The method of claim 5, further comprising:
   calculating a respective width of each of the plurality of relation lines based on respective updated horizontal positions of the respective first term and the corresponding second term associated with each relation line after resizing the display of the plurality of lines of natural text; and
   reclassifying the plurality of relation lines into the updated layers based on the respective calculated width of each of the plurality of relation lines.

7. A computer program product comprising a processor-readable storage medium having program instructions embodied thereon, wherein the program instructions are configured, when executed by at least one programmable processor, to cause the at least one programmable processor to:

output instructions to a display device to display a plurality of lines of natural language text on a display device, wherein natural language text is text written and displayed using grammar and words understandable by a human;

output instructions to the display device to render a plurality of relation lines, wherein each relation line connects a respective first term in the natural language text to a corresponding second term in the natural language text, wherein at least one relation line of the plurality of relation lines is rendered crossing over one or more words in one or more lines of the natural language text to connect the respective first term and the corresponding second term;

classify each relation line of the plurality of relation lines into a corresponding layer of a plurality of layers based on respective vertical and horizontal positions of the respective first term and the corresponding second term associated with each respective relation line; and output instructions to the display device to adjust vertical spacing between each of the plurality of lines of natural language text based on a respective number of layers between each of the plurality of lines of natural language text.

8. The computer program product of claim 7, wherein the program instructions are further configured to cause the at least one programmable processor to:

calculate a width of each relation line based on a horizontal distance between the respective first term and the corresponding second term associated with each respective relation line; and classify each of the plurality of layers into sub-layers based on the respective calculated widths of the plurality of relation lines associated with each layer.

9. The computer program product of claim 8, wherein the program instructions are further configured to cause the at least one programmable processor to adjust the vertical spacing between each of the plurality of lines of natural language text based on the number of sub-layers.

10. The computer program product of claim 7, wherein the program instructions are further configured to cause the at least one programmable processor to resize the display of the plurality of lines of natural language text and the display of the plurality of relation lines;

wherein resizing the display of the plurality of lines of natural language text includes wrapping the natural language text to change the number of lines of natural language text and corresponding portions of natural language text on each line; and wherein resizing the display of the plurality of relation lines includes readjusting the vertical spacing between each of the plurality of lines of natural language text after changing the number of lines of natural language text and corresponding portions of natural language text on each line.

11. The computer program product of claim 10, wherein the program instructions are further configured to cause the at least one programmable processor to:

reclassify the plurality of relation lines into updated layers based on updated respective vertical positions of the respective first term and corresponding second term associated with each relation line after resizing the display of the plurality of lines of natural text; and readjust the vertical spacing between each of the plurality of lines of natural language text based on the number of updated layers between each of the plurality of lines of natural language text.

12. The computer program product of claim 11, wherein the program instructions are further configured to cause the at least one programmable processor to:

calculate a respective width of each of the plurality of relation lines based on respective updated horizontal positions of the respective first term and the corresponding second term associated with each relation line after resizing the display of the plurality of lines of natural text; and reclassify the plurality of relation lines into the updated layers based on the respective calculated width of each of the plurality of relation lines.

13. A system comprising:

a display device;

an input device configured to receive user input; and a processor communicatively coupled to the display device and the input device;

wherein the processor is configured to cause the display device to display a plurality of lines of natural language text on the display device together with corresponding annotations including a plurality of relation lines, wherein each relation line connects a respective first term in the natural language text to a corresponding second term in the natural language text;

wherein natural language text is text written and displayed using grammar and words understandable by a human;

wherein the processor is configured to cause the display device to render at least one relation line of the plurality of relation lines crossing over one or more words in one or more lines of the natural language text to connect the respective first term and the corresponding second term;

wherein the processor is configured to classify each relation line of the plurality of relation lines into a corresponding layer based on respective vertical and horizontal positions of the respective first term and the corresponding second term associated with each respective relation line; and wherein the processor is configured to adjust spacing between each of the plurality of lines of natural language text based on a respective number of layers between each of the plurality of lines of natural language text.

14. The system of claim 13, wherein the processor is configured to calculate a respective width of each of the plurality of relation lines based on the respective horizontal positions of the respective first term and corresponding second term associated with each relation line; and wherein the processor is further configured to classify the plurality of relation lines into the layers based on the respective calculated width of each of the plurality of relation lines.

15. The system of claim 13, wherein, based on received user input via the input device, the processor is configured to resize the display of the plurality of lines of natural language text and the plurality of relation lines;

wherein resizing the display of the plurality of lines of natural language text includes wrapping the natural language text to change the number of lines of natural language text and corresponding portions of natural language text on each line;

wherein resizing the display of the plurality of relation lines includes readjusting the spacing between each of the plurality of lines of natural language text after changing the number of lines of natural language text and corresponding portions of natural language text on each line.

16. The system of claim 15, wherein the processor is configured to reclassify the plurality of relation lines into updated layers based on updated respective vertical positions of the respective first term and the corresponding second term associated with each relation line after resizing the display of the plurality of lines of natural text; and wherein the processor is further configured to readjust the spacing between each of the plurality of lines of natural language text based on the number of updated layers between each of the plurality of lines of natural language text.

17. The system of claim 16, wherein the processor is configured to calculate a respective width of each of the plurality of relation lines based on respective updated horizontal positions of the respective first term and the corresponding second term associated with each relation line after resizing the display of the plurality of lines of natural text; and wherein the processor is further configured to reclassify the plurality of relation lines into the updated layers based on the respective calculated width of each of the plurality of relation lines.

* * * * *